United States Patent
Lee

(10) Patent No.: US 9,648,235 B2
(45) Date of Patent: May 9, 2017

(54) PORTABLE TERMINAL AND METHOD FOR DRIVING THE SAME

(75) Inventor: Junghyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/234,591

(22) PCT Filed: Jul. 19, 2012

(86) PCT No.: PCT/KR2012/005779
§ 371 (c)(1),
(2), (4) Date: Jan. 23, 2014

(87) PCT Pub. No.: WO2013/024974
PCT Pub. Date: Feb. 21, 2013

(65) Prior Publication Data
US 2014/0139696 A1  May 22, 2014

(30) Foreign Application Priority Data
Aug. 12, 2011 (KR) .................. 10-2011-0080567

(51) Int. Cl.
*H04N 5/232* (2006.01)
*G06F 1/16* (2006.01)
*H04W 4/02* (2009.01)
*H04W 52/02* (2009.01)
*G06F 3/01* (2006.01)
*H04N 5/225* (2006.01)

(52) U.S. Cl.
CPC ....... *H04N 5/23241* (2013.01); *G06F 1/1694* (2013.01); *G06F 3/017* (2013.01); *H04N 5/2257* (2013.01); *H04W 4/027* (2013.01); *H04W 52/0254* (2013.01); *G06F 2200/1637* (2013.01)

(58) Field of Classification Search
CPC .................. H04N 5/23251; H04N 5/23254
USPC ........................................... 348/208.1
See application file for complete search history.

(56) References Cited

U.S. PATENT DOCUMENTS

| 6,992,699 B1* | 1/2006 | Vance et al. ............. 348/207.99 |
| 2005/0203430 A1 | 9/2005 | Williams et al. |
| 2006/0240866 A1* | 10/2006 | Eilts .......................... 455/556.1 |
| 2009/0138736 A1* | 5/2009 | Chin ............................ 713/320 |
| 2010/0118154 A1* | 5/2010 | Lee ....................... H04N 5/232 348/208.4 |
| 2010/0253792 A1* | 10/2010 | Kawaguchi et al. ...... 348/208.2 |
| 2011/0076003 A1 | 3/2011 | Cho et al. |
| 2012/0224072 A1* | 9/2012 | Koo et al. ................ 348/208.2 |

FOREIGN PATENT DOCUMENTS

KR  20-2009-004399 U  5/2009

* cited by examiner

*Primary Examiner* — Anthony J Daniels
(74) *Attorney, Agent, or Firm* — Birch, Stewart, Kolasch & Birch, LLP

(57) ABSTRACT

Disclosed is a portable terminal and a method for driving the portable terminal, the portable terminal including a camera module capturing an image of an object, a position information obtaining sensor detecting a motion of the portable terminal, and a controller driving the camera module using the motion of the portable terminal detected by the position information obtaining sensor.

14 Claims, 3 Drawing Sheets

Fig. 1
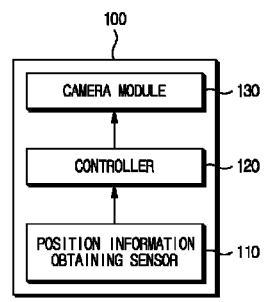
[Fig. 2]
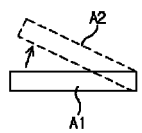
Fig. 3
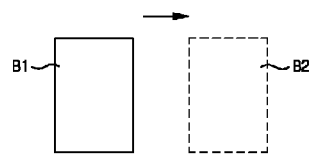
Fig. 4
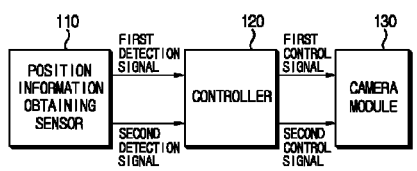
Fig. 5
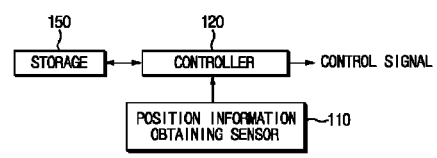

PORTABLE TERMINAL AND METHOD FOR DRIVING THE SAME

TECHNICAL FIELD

The teachings in accordance with exemplary embodiments of this invention generally relate to a portable terminal and a method for driving the portable terminal.

BACKGROUND ART

A portable terminal is a portable device capable of performing functions of voice and image communications, inputting/outputting information and storing data according to ease of their mobility and portability.

That is, as functions of the portable terminal become more diversified, the portable terminal can support more complicated functions such as capturing images or video, reproducing music or video files, playing games and receiving broadcast signals. By comprehensively and collectively implementing such functions, the portable terminal may be embodied in the form of a camera, a multimedia player, a music or video player and the like.

Various attempts have been made to implement complicated functions in such a multimedia device by means of hardware or software. As the portable terminals are conveniently used to be considered as a personal belonging, various designs are required and form factors become diverse for a user's easy selection according to a personality.

Meanwhile, the portable terminal includes a camera module capable of photographing an object in a still image or a moving image, storing an image data thereof and editing and transmitting the image data when needs arise. However, there is a disadvantage for a user to click a case of the portable terminal or an icon of a touch screen, in order to activate the camera module for photographing an image of an object.

A Korean Laid-Open Patent Publication No. 2011-0012110 is disclosed as a background technology thereto, where a particular position on a portable terminal applied with a shock or a motion detected by a first and second motion sensors is grasped as a touch position to use the touched position as input information. However, a background technology to activate a camera module is yet to be available, such that development of such technology is urgently needed.

DISCLOSURE OF INVENTION

Technical Problem

Accordingly, embodiments of the present invention has been made keeping in mind with the above requirements or problems occurring in the prior art, and embodiments of the present invention is to provide a portable terminal configured to reduce a consumption time for clicking a mechanical button mounted on a case of the portable terminal or for activating a camera module on an application, by driving the camera module using a particular motion of the portable terminal, and a method for driving the portable terminal.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of embodiments of the present invention, there is provided a portable terminal, the portable terminal comprising: a camera module capturing an image of an object; a position information obtaining sensor detecting a motion of the portable terminal; and a controller driving the camera module using the motion of the portable terminal detected by the position information obtaining sensor.

Preferably, the portable terminal further comprises storage storing data corresponding to the motion of the portable terminal detected by the position information obtaining sensor, wherein the controller outputs a control signal to the camera module to drive the camera module, in case it is determined that the motion of the portable terminal detected by the position information obtaining sensor and the motion store in the storage are identical by comparing the motion of the portable terminal detected by the position information obtaining sensor with the motion store in the storage.

Preferably, the camera module includes a camera module driving unit driving the camera module, a power source supplying a voltage to the camera module driving unit, and a switching unit interposed between the camera module driving unit and the power source to switch the voltage supplied from the power source using the control signal from the controller.

Preferably, the switching unit supplies voltage to the camera module driving unit from the power source using the control signal of the controller, or interrupts the voltage supplied to the camera module using the control signal of the controller.

Preferably, the driving of the camera module is to turn on the camera module.

Preferably, the driving of the camera module is to turn off the camera module.

Preferably, the position information obtaining sensor includes an acceleration sensor sensing each angular velocity of X, Y, Z and a tilt to each direction.

Preferably, the position information obtaining sensor includes a gyro sensor sensing a direction rotated to a standard direction.

Preferably, the motion of the portable terminal is a motion of the portable terminal being rotated.

Preferably, the motion of the portable terminal is a motion of the portable terminal being moved.

In another general aspect of embodiments of the present invention, there is provided a method for driving a portable terminal, the method comprising: detecting, by a position information obtaining sensor, a motion of the portable terminal; determining whether the motion of the portable terminal detected by the position information obtaining sensor is a particular motion; and turning on or turning off the camera module, in case it is determined that the motion of the portable terminal detected by the position information obtaining sensor is the particular motion.

Preferably, the step of turning on or turning off the camera module, in case it is determined that the motion of the portable terminal detected by the position information obtaining sensor is the particular motion includes determining whether the captured motion is released, in case the camera module is turned on, and turning off the camera module, in case the captured motion is released.

Preferably, the particular motion of the portable terminal is a motion to rotate the portable terminal, or a motion to horizontally or vertically move the portable terminal.

Preferably, the step of turning on or turning off the camera module, in case it is determined that the motion of the portable terminal detected by the position information obtaining sensor is the particular motion includes determining whether the captured motion is released, in case the camera module is turned on, and turning off the camera module, in case the captured motion is released.

Preferably, the particular motion of the portable terminal is a motion of the portable terminal being rotated or moved.

Advantageous Effects of Invention

The portable terminal and method for driving the portable terminal according to the present invention has an advantageous effect in that a position information obtaining sensor detects the particular motion, and a controller can immediately turn on and/or off a camera module in response to the detected particular motion, in case a user performs a particular motion of the portable terminal, such as rotates and/or moves the portable terminal.

The portable terminal and method for driving the portable terminal according to embodiments of the present invention has another advantageous effect in that a particular motion of a camera module can drive a camera module to reduce a consumption time for clicking a mechanical button mounted on a case of the portable terminal or for activating the camera module on an application.

BRIEF DESCRIPTION OF DRAWINGS

FIG. 1 is a schematic block diagram illustrating configuration of a portable terminal according to embodiments of the present invention;

FIG. 2 is a schematic view illustrating a motion of a portable terminal according to an exemplary embodiment of the present invention;

FIG. 3 is schematic view illustrating a motion of a portable terminal according to another exemplary embodiment of the present invention;

FIG. 4 is a schematic block diagram illustrating configuration of a portable terminal according to embodiments of the present invention;

FIG. 5 is a schematic block diagram illustrating configuration of a portable terminal according to an exemplary embodiment of the present invention;

BEST MODE FOR CARRYING OUT THE INVENTION

Figure 6:
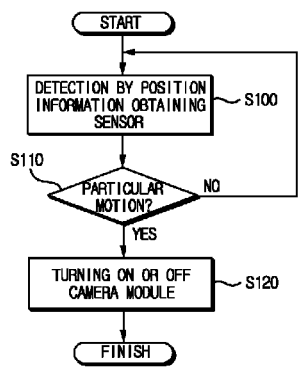
FIG. 6 is a flowchart of a method for driving a portable terminal according to an exemplary embodiment of the present invention.

The following description is not intended to limit the invention to the form disclosed herein. Consequently, variations and modifications commensurate with the following teachings, and skill and knowledge of the relevant art are within the scope of embodiments of the present invention. The embodiments described herein are further intended to explain modes known of practicing the invention and to enable others skilled in the art to utilize the invention in such, or other embodiments and with various modifications required by the particular application(s) or use(s) of embodiments of the present invention.

The disclosed embodiments and advantages thereof are best understood by referring to FIGS. 1-11 of the drawings, like numerals being used for like and corresponding parts of the various drawings. Other features and advantages of the disclosed embodiments will be or will become apparent to one of ordinary skill in the art upon examination of the following figures and detailed description.

Embodiments of the present invention may be applicable to various types of portable terminals. Examples of such terminals may include mobile terminals as well as stationary terminals, such as mobile phones, user equipment, smart phones, notebook computers, DTV, computers, digital broadcast terminals, PDAs (personal digital assistants), portable multimedia players (PMP) and/or navigators.

The portable terminals of embodiments of the present invention may include all types of portable terminals including folder types, bar types, swing types and slider types of portable terminals.

Now, a portable terminal and a method for driving the portable terminal according to exemplary embodiments of the present invention will be described in detail with reference to the accompanying drawings.

FIG. 1 is a schematic block diagram illustrating configuration of a portable terminal according to the present invention, FIG. 2 is a schematic view illustrating a motion of a portable terminal according to an exemplary embodiment of the present invention, and FIG. 3 is schematic view illustrating a motion of a portable terminal according to another exemplary embodiment of the present invention.

A portable terminal (100) according to embodiments of the present invention includes a camera module (130) capturing an image of an object, a position information obtaining sensor (110) detecting a motion of the portable terminal, and a controller (120) turning on or turning off the camera module (130) using the motion of the portable terminal detected by the position information obtaining sensor (110).

The position information obtaining sensor (110) may obtain position information using an acceleration sensor sensing each angular velocity of X, Y, Z and a tilt to each direction, and a gyro sensor sensing a direction rotated relative to a standard direction.

Thus, the portable terminal according to embodiments of the present invention is advantageous in that the portable terminal, the position information obtaining sensor (110) detects the particular motion, and a controller (120) can immediately turn on and/or off a camera module (130) in response to the detected particular motion, in case a user performs a particular motion of the portable terminal, such as rotates and/or moves the portable terminal.

The portable terminal and method for driving the portable terminal according to embodiments of the present invention is further advantageous in that a particular motion of a camera module can drive a camera module to reduce a consumption time for clicking a mechanical button mounted on a case of the portable terminal or for activating the camera module on an application.

Examples of motions by the portable terminal thus configured may include a motion rotating the portable terminal from 'A1' state to 'A2' state, as shown in FIG. 2, or a motion moving the portable terminal from 'B1' state to 'B2' state, or moving to horizontal direction or to vertical direction, as shown in FIG. 3.

Figure 7:
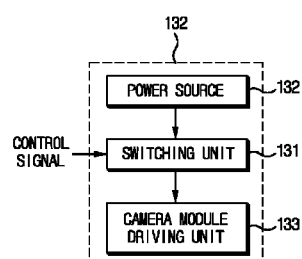
FIG. 7 is a schematic driving block diagram illustrating a partial configuration of a camera module on a portable terminal according to an exemplary embodiment of the present invention.

FIG. 4 is a schematic block diagram illustrating configuration of a portable terminal according to embodiments of the present invention, FIG. 5 is a schematic block diagram illustrating configuration of a portable terminal according to an exemplary embodiment of the present invention, and FIG. 7 is a schematic driving block diagram illustrating a partial configuration of a camera module on a portable terminal according to an exemplary embodiment of the present invention.

Referring to FIG. 4, the position information obtaining sensor (110) detects a first motion of the portable terminal, the position information obtaining sensor (110) outputs a first detection signal to the controller (120) using the detected first motion, and the controller (120) outputs a first control signal corresponding to the first detection signal to the camera module (130) to turn on operation of the camera module (130).

In a case the position information obtaining sensor (110) detects a second motion of the portable terminal, the position information obtaining sensor (110) outputs a second detection signal to the controller (120) using the detected second motion, and the controller (120) outputs a second control signal corresponding to the second detection signal to the camera module (130) to turn off the operation of the camera module (130).

The portable terminal according to embodiments of the present invention may further include storage (150) storing data corresponding to the motion of the portable terminal detected by the position information obtaining sensor (110), wherein the controller (120) outputs a control signal to the camera module (130) to turn on or turn off the operation of the camera module (130), in case it is determined that the motion of the portable terminal detected by the position information obtaining sensor (110) and the motion stored in the storage are identical by comparing the motion of the portable terminal detected by the position information obtaining sensor (110) with the motion store stored in the storage.

That is, the controller (120) receives a first detection signal corresponding to the first motion detected by the position information obtaining sensor (110) and a second detection signal corresponding to the second motion, and the controller (120) reads out data corresponding to first and second motions stored in the storage (150) to determine whether the data correspond to the first and second detection signals, where the motions stored in the storage (150) are particular motions turning on or turning off the camera module (130).

Referring to FIG. 7, the camera module (130) includes a camera module driving unit (133) driving the camera module, a power source (132) supplying a voltage to the camera module driving unit (133), and a switching unit (131) interposed between the camera module driving unit (133) and the power source (132) to switch the voltage supplied from the power source (132) using the control signal from the controller (120). That is, the control signal of the controller (120) is inputted to the switching unit (131).

At this time, the switching unit (131) supplies voltage to the camera module driving unit (133) from the power source using the control signal of the controller, or interrupts the voltage supplied to the camera module using the control signal of the controller.

MODE FOR THE INVENTION

Figure 8:
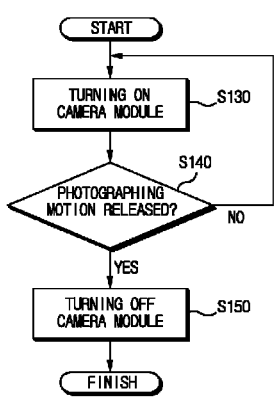
FIG. 8 is another flowchart of a method for driving a portable terminal according to an exemplary embodiment of the present invention.
Figure 9:
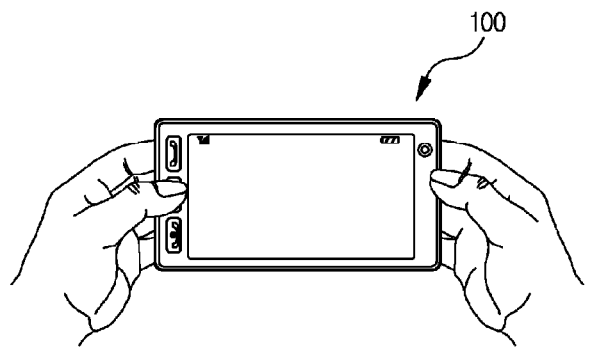
FIG. 9 is a conceptual view illustrating a motion captured by a portable terminal according to embodiments of the present invention.
Figure 10:
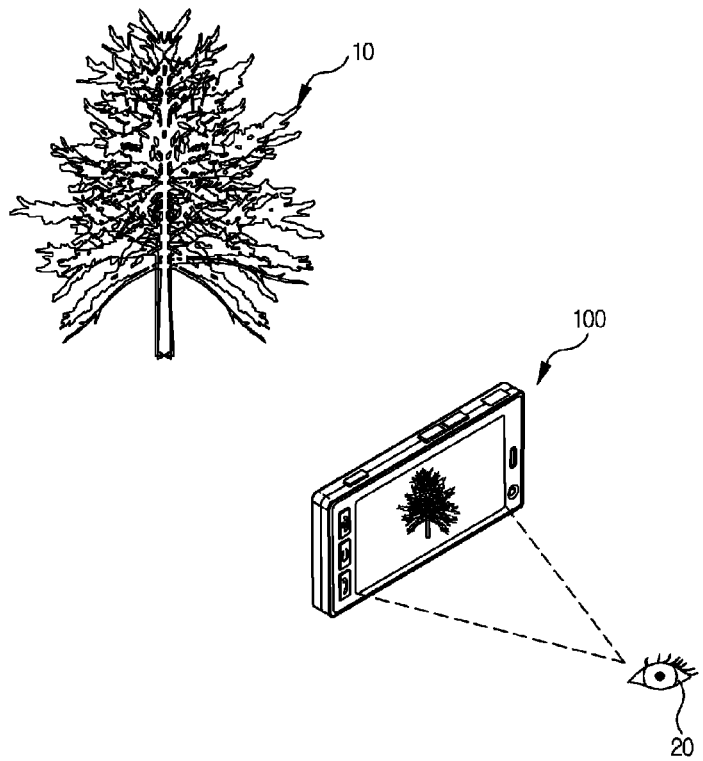
FIG. 10 is a conceptual view illustrating an object captured by a portable terminal according to embodiments of the present invention.
Figure 11:
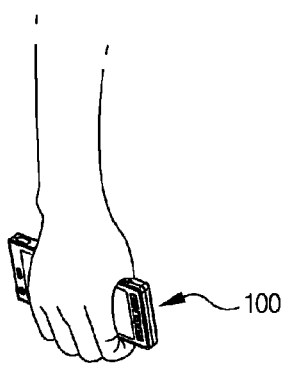
FIG. 11 is a conceptual view illustrating a motion for turning off a camera module of a portable terminal according to embodiments of the present invention.

FIG. 6 is a flowchart of a method for driving a portable terminal according to an exemplary embodiment of the present invention, FIG. 8 is another flowchart of a method for driving a portable terminal according to an exemplary embodiment of the present invention, FIG. 9 is a conceptual view illustrating a motion captured by a portable terminal according to embodiments of the present invention, FIG. 10 is a conceptual view illustrating an object captured by a portable terminal according to embodiments of the present invention, and FIG. 11 is a conceptual view illustrating a motion for turning off a camera module of a portable terminal according to embodiments of the present invention.

A method for driving a portable terminal is to first detect, by a position information obtaining sensor, a motion of the portable terminal (S100), to determine whether the motion of the portable terminal detected by the position information obtaining sensor is a particular motion (S110), and to turn on or turn off the camera module, in case it is determined that the motion of the portable terminal detected by the position information obtaining sensor is the particular motion (S120).

At this time, in the step of S120, in case the camera module is turned on and is driven as in S130 of FIG. 8, whether the captured motion is released is determined (S140), where the captured motion may include, in a non-limiting example, a motion of holding, by a user, the portable terminal (100) as illustrated in FIG. 9, capturing an object (10) as shown in FIG. 10, or a motion of visually viewing a display of the portable terminal (100) using an eye (20) of the user to capture the object.

Successively, in case the capturing motion is released, the camera module is turned off (S150). The release of capturing motion may include, in a non-limiting example, a motion of holding the portable terminal (100) with hand as shown in FIG. 11, away from the motions in FIGS. 9 and 10.

The previous description of embodiments of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The portable terminal and method for driving the same according to embodiments of the present invention has an industrial applicability in that a particular motion of a camera module can drive the camera module to reduce a consumption time for clicking a mechanical button mounted on a case of the portable terminal or for activating the camera module on an application.

The invention claimed is:
1. A portable terminal, the portable terminal comprising:
a camera module capturing an image of an object;
position information obtaining sensors detecting a first motion of the portable terminal or a second motion of the portable terminal;
a storage in which data corresponding to a first particular motion for turning-on the camera module and a second particular motion for turning-off the camera module is pre-stored; and a controller configured to control turning-on or turning-off the camera module using the first motion or the second motion of the portable terminal detected by the position information obtaining sensors, respectively, wherein the controller is configured to turn on or turn off the camera module when it is determined that the first motion or the second motion of the portable terminal and the first particular motion or the second particular motion, respectively, are identical by comparing data corresponding to the first motion or the second motion of the portable terminal with the data corresponding to the first particular motion or the second particular motion, respectively, pre-stored in the storage.

2. The portable terminal of claim 1, wherein the camera module includes a camera module driving unit driving the camera module, a power source supplying a voltage to the camera module driving unit, and a switching unit interposed between the camera module driving unit and the power source to switch the voltage supplied from the power source using the control signal from the controller.

3. The portable terminal of claim 2, wherein the switching unit supplies voltage to the camera module driving unit from the power source using the control signal of the controller, or interrupts the voltage supplied to the camera module using the control signal of the controller.

4. The portable terminal of claim 1, wherein the driving of the camera module is to turn on the camera module.

5. The portable terminal of claim 1, wherein the driving of the camera module is to turn off the camera module.

6. The portable terminal of claim 1, wherein the position information obtaining sensors include an acceleration sensor sensing each angular velocity of X, Y, Z and a tilt to each direction.

7. The portable terminal of claim 6, wherein the position information obtaining sensors include a gyro sensor sensing a direction rotated to a standard direction.

8. The portable terminal of claim 1, wherein the first motion or the second motion of the portable terminal includes a motion of the portable terminal being rotated.

9. The portable terminal of claim 1, wherein the first motion or the second motion of the portable terminal includes a motion of the portable terminal being moved.

10. A method for driving a portable terminal, the method comprising:

detecting, by position information obtaining sensors, a first motion of the portable terminal or a second motion of the portable terminal;

comparing data corresponding to the first motion or the second motion of the portable terminal detected by the position information obtaining sensors with data corresponding to a first particular motion for turning-on a camera module and a second particular motion for turning-off the camera module pre-stored in a storage; and turning on or turning off a camera module when it is determined that the first motion or the second motion of the portable terminal detected by the position information obtaining sensors and the first particular motion or second particular motion, respectively, pre-stored in the storage are identical.

11. The method of claim 10, wherein the step of turning on or turning off the camera module includes determining whether the captured motion is released, in case the camera module is turned on, and turning off the camera module, in case the captured motion is released.

12. The method of claim 10, wherein the first particular motion or the second particular motion of the portable terminal includes a motion to rotate the portable terminal, or a motion to horizontally or vertically move the portable terminal.

13. The method of claim 12, wherein the step of turning on or turning off the camera module includes determining whether the captured motion is released, in case the camera module is turned on, and turning off the camera module, in case the captured motion is released.

14. The method of claim 11, wherein the first particular motion or the second particular motion of the portable terminal includes a motion of the portable terminal being rotated or moved.

\* \* \* \* \*